INVENTOR
HANS SPIRO
BY Maurice H. Klitzman
ATTORNEY

United States Patent Office 3,451,012

Patented June 17, 1969

3,451,012

FREQUENCY SHIFT KEYING MODULATOR

Hans Spiro, Boblingen, Germany, assignor to International Business Machines Corporation, Armonk, N.Y., a corporation of New York Continuation of application Ser. No. 496,410, Oct. 15, 1965. This application May 8, 1968, Ser. No. 727,748

Claims priority, application Germany, Oct. 21, 1964, J 26,730

Int. Cl. H03c *3/08, 3/00, 3/12*

U.S. Cl. 332—18 2 Claims

ABSTRACT OF THE DISCLOSURE

An asynchronous frequency shift modulator having a combination of a capacitor and a switchable inductor resonant circuit in which a constant current and voltage are maintained when shifting its resonant frequency. Current flowing through the active inductor pre-energizes the unconnected inductor in proper phase amplitude This application is a continuation of application Ser. No. 496,410, filed Oct. 15, 1965.

The invention relates to frequency shift transmission systems and more particularly to distortion-free modulators for asynchronous frequency shift keying using self-excited oscillators.

Frequency shift keyed modulators convert digital data in the form of square wave pulses into corresponding alternate frequencies of the sinusoidal carrier signal in the transmitter. This modulated carrier is transmitted and reconverted into the original square wave in the receiver by a demodulator. Such demodulators sequentially examine the ZERO crossings of the incoming signal to obtain the transmitted information.

Conventional frequency shift key modulators cause phase errors and transients when shifting from one frequency to another and the resulting time displacements in the recovered square wave pulses regenerated by the demodulator produce undesirable errors in the received data. Such phase errors primarily occur because of the asynchronous relationship of the two frequencies between which the modulator is shifted and the fundamental wave of the modulator square wave. Such distortions are minor and can be tolerated in low speed transmission systems wherein the data transmission rate is small with respect to the carrier frequency. However, in high speed data transmission systems such phase distortions cannot be neglected.

Prior art modulators have attempted to reduce or eliminate such distortions. One such technique provides an interval between frequency shifts wherein the amplitude of oscillation is allowed to decay prior to shifting and then allowed to build up at the new frequency. It is apparent that such operation has the disadvantages of lost transmission time and requires additional circuitry to insure correct data transmission. Another prior art solution requires a two-stage modulator wherein the oscillation frequency of the individual modulators are selected to be higher than the fundamental oscillation of the modulating data wave. This insures that the phase error distortions in the shifting process remain sufficiently small. However, an additional converter is required to convert the high frequencies into the desired range of transmission. Consequently, techniques employing two-stage modulators are expensive and complex.

To insure distortion-free asynchronous frequency shift keying in modulators using a frequency-determining resonant circuit, it is necessary to maintain constant current and voltage in the resonant circuit when shifting its resonant frequency. Additionally, a constant ratio of the inductance to capacitance of the resonant circuit must be maintained before and after the shift.

Consequently, it is an object of this invention to eliminate, in an improved manner, phase and amplitude distortion in frequency shift keyed modulators.

It is another object of this invention to provide an improved single-stage frequency shift modulator to eliminate frequency distortions.

It is still a further object of this invention to eliminate phase distortion in a single-stage frequency shift keyed modulator without the addition of complex circuitry.

The modulator according to this invention is preferably constructed such that the resonant circuit comprises a capacitor and a switchable frequency-determining inductor such that the resonant circuit current flowing through the active inductor pre-energizes the unconnected inductor in proper phase amplitude to prevent distortion when the modulator is shifted in frequency.

In accordance with one embodiment of the invention, the pre-energization of the inactive inductor is effected through amplifiers whose inputs are connected to the resonant circuit and whose outputs are connected respectively to the inductor that is not active. Proper phase and amplitude pre-energization is achieved by designing the voltage gain of one amplifier to be equal to the ratio of the two oscillator frequencies and that of the other amplifier equal to the inverse ratio of the two oscillator frequencies.

In accordance with another aspect of the invention, the modulator is constructed using two transformers as the frequency-determining inductors. The two transformers are magnetically decoupled with respect to one another but closely coupled magnetically between their respective primary and secondary windings. At one frequency, the primary winding of the first transformer is connected to a single resonant element while the secondary winding of the second transformer is simultaneously pre-energized through an amplifier having unity voltage gain and ZERO phase shift. When shifting to the other frequency, the secondary winding of the second transformer is connected to the single resonant element and simultaneously pre-energizes the primary winding of the first transformer through the same amplifier which now acts on the secondary winding of the first transformer.

And yet in another embodiment of the invention, an auto-transformer is used as the frequency-determining inductors and the pre-energization of the unconnected primary or secondary winding is achieved in accordance with the transformation ratio.

The foregoing and other objects, features and advantages of the invention will be apparent from the following more particular description of preferred embodiments of the invention, as illustrated in the accompanying drawings.

*Description*

Figure 1:
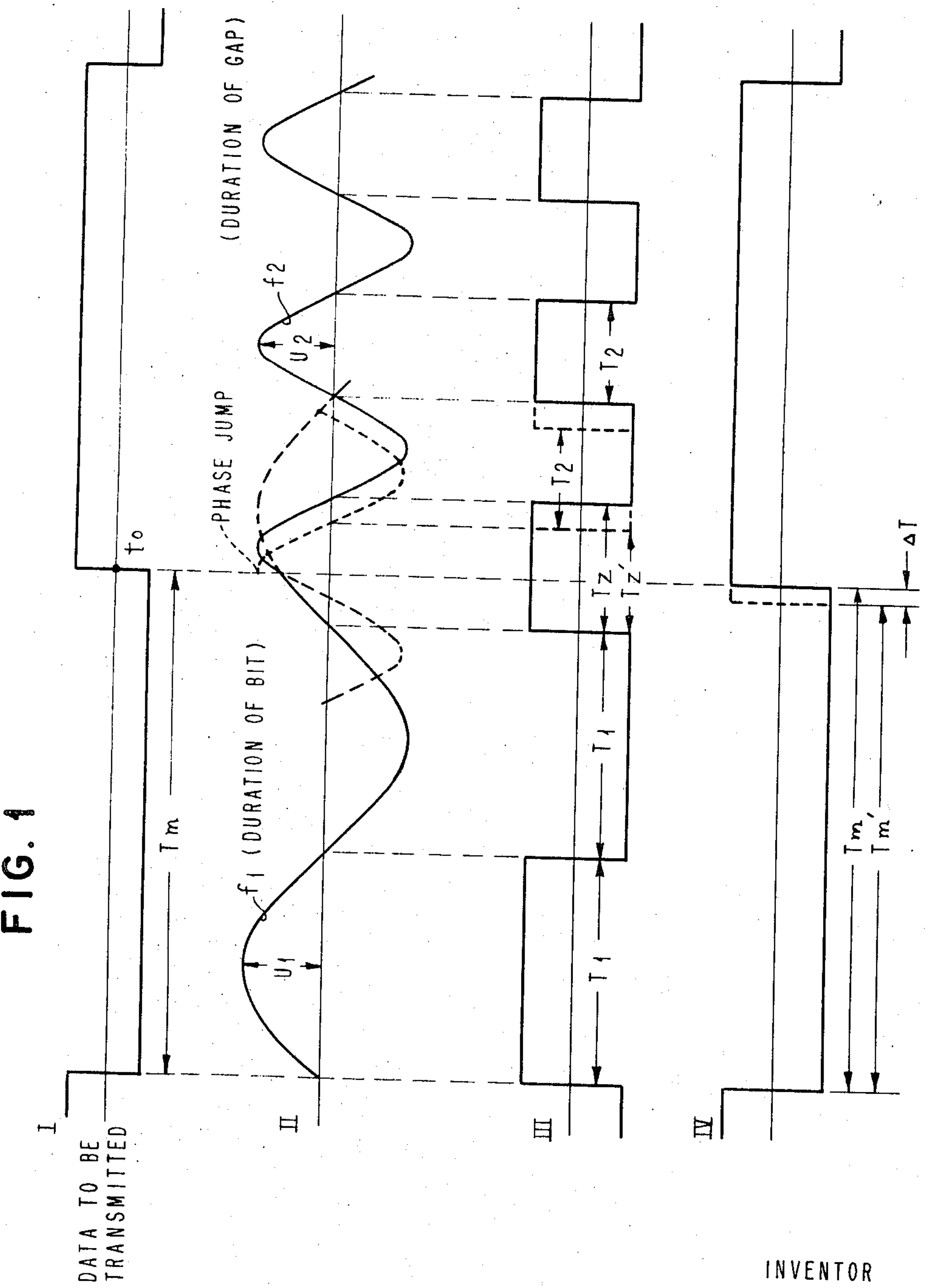
FIG. 1 shows the essential wave forms during the transmission of data by means of frequency shift keying.

Curve I of FIG. 1 shows a square wave of bit length $Tm$ which characterizes the data to be transmitted. This square wave is applied to a modulator to produce a sine wave of frequency $f1$ during the interval of a pulse representing a bit and a sine wave of frequency $f2$ for the interval of a pulse gap as shown in curve II. The frequency shift from $f1$ to $f2$ occurs at time $t_0$.

The transmitted frequencies $f1$ and $f2$ are normally passed through a limiter at the receiver to eliminate noise.

The output of the limiter is, ideally, a square wave corresponding to curve III. This square wave signal is applied to a demodulator which determines the signal content by examining the intervals between ZERO crossings. A period T1 thus exists between ZERO crossings when frequency $f1$ is present and a period T2 exists between ZERO crossings when the frequency $f2$ is present. At the time $t_0$, however, during the shifting process, an intermediate value Tz occurs between ZERO crossings. If the modulation is distortion-free, the demodulator can reconstruct the exact shifting time $t_0$ from the interval Tz. The demodulator can thus reconstruct from curve III the signal shown in curve IV which corresponds to curve I which represents the original data signal.

However, transients and phase errors will normally be produced in the modulator since the shifting time $t_0$ and the ZERO crossings of frequency waves $f1$ and $f2$ may be asynchronous with respect to each other. The occurrence of such phase distortion is illustrated in curve II by the dotted wave form. Such phase distortion shifts the ZERO crossing of signal frequency $f2$ which results in an interval Tz′ during the shifting process at time $t_0$. As the interval Tz′ is higher or lower than the interval Tz, the demodulator reconstructs from the erroneous intermediate value Tz′ an incorrect bit length T$m'$. This bit length differs from the correct bit length T$m$ by the amount ΔT and, consequently, the ratio of ΔT to T$m$ is a direct measure of the data distortion.

Phase shifts or distortions also result from unequal amplitudes U1 and U2 of the two transmitted sine waves. Rapid amplitude changes produce phase distortion because of induced transients.

The operation of the modulator in accordance with the invention is characterized in that it produces no phase jumps as shown by the solid line in curve II. As shown in curve II, a smooth transition from one wave into the other is achieved at any shifting time without producing transients. This has the effect of preserving the interval Tz such that the demodulator at the receiver can accurately derive shifting time $t_0$ to determine interval T$m$ to correctly reconstruct the data signal.

Figure 2:
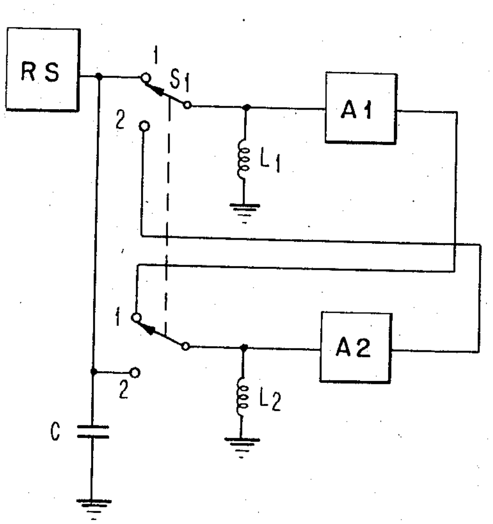
FIGS. 2–5 are basic circuit diagrams of embodiments of the invention.

The modulator according to the embodiment illustrated in FIG. 2 comprises a feed-back circuit RS in connection with a parallel resonant circuit to generate oscillatory signals. Feed-back circuit RS is not critical to the invention and may be of a well-known structure. The resonant circuit comprises capacitor C, inductor L1, and inductor L2. Switch S1 serves to connect L1 in parallel with capacitor C in switch position 1 and inductor L2 in parallel with capacitor C in switch position 2 to provide two frequency-determining elements. Inductor L1 is connected to the input of amplifier A1 and inductor L2 is connected to the input of amplifier A2. In switch position 1 the output of amplifier A1 is connected to inductor L2 and the input of amplifier A2, respectively. In switch position 2 the output of amplifier A2 is connected to inductor L1 and the input of amplifier A1, respectively. Switch S1 effects the actual frequency shifting in accordance with the square wave representing the data. The oscillator operates at frequency $f1$ in switch position S1 and at frequency $f2$ in switch position 2.

Figure 3:
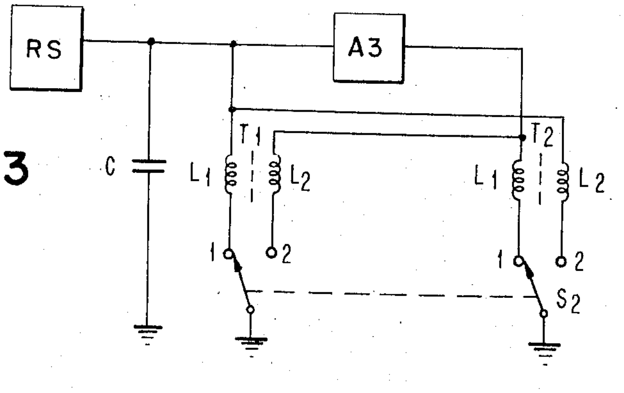

FIG. 3 shows an embodiment comprising a feed-back circuit RS in coaction with a parallel resonant circuit. The resonant circuit comprises capacitor C which is connected to the necessary frequency-determining inductor for the desired frequency. The primary and secondary windings of two identical transformers T1 and T2 are used as the connectable inductors L1 and L2. Frequency $f1$ is generated with switch S2 in position 1 whereby primary winding L1 of transformer T1 and, primary winding L1 of transformer T2 are parallely connected to capacitor C. The generation of frequency $f2$ corresponds to switch position 2 of switch S2 which parallely connects to capacitor C, secondary winding 2 of transformer T2 and, via amplifier A3, secondary winding L2 of transformer T1.

A more simplified embodiment of the modulator according to the invention is shown in FIG. 4 which again comprises feed-back circuit RS in combination with a parallel resonant circuit comprising a capacitor C and inductors L1 and L2 which are connectable to capacitor C by means of switch S3. Inductors L1 and L2 are formed by the primary and secondary windings of transformer T3. Frequency $f1$ is generated when inductor L1 is connected to the capacitor C when switch S3 is in position 1; and frequency $f2$ is generated when switch S3 is in position 2, thereby connecting L2 in parallel with capacitor C.

Figure 4:
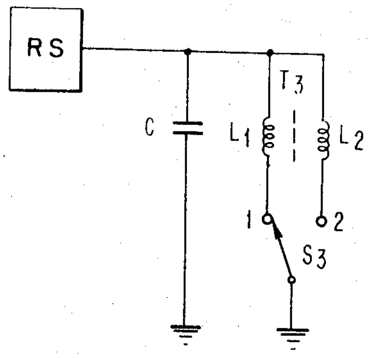
Figure 5:
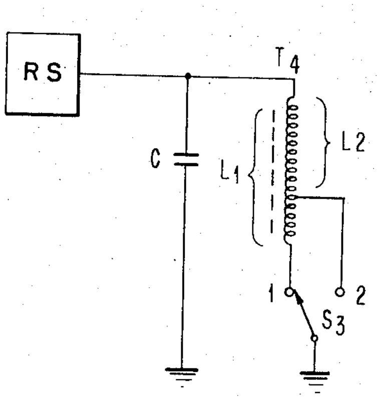

The embodiment illustrated in FIG. 5 is essentially identical to that shown in FIG. 4 with the exception that the autotransformer T4 replaces transformer T3. Frequency $f1$ is generated by connecting primary winding L1 of transformer T4 in parallel with capacitor C through switch S3 in position 1. With switch S3 in position 2, the secondary winding L2 of transformer T4 is parallely connected with capacitor C to generate frequency $f2$.

Figure 6:
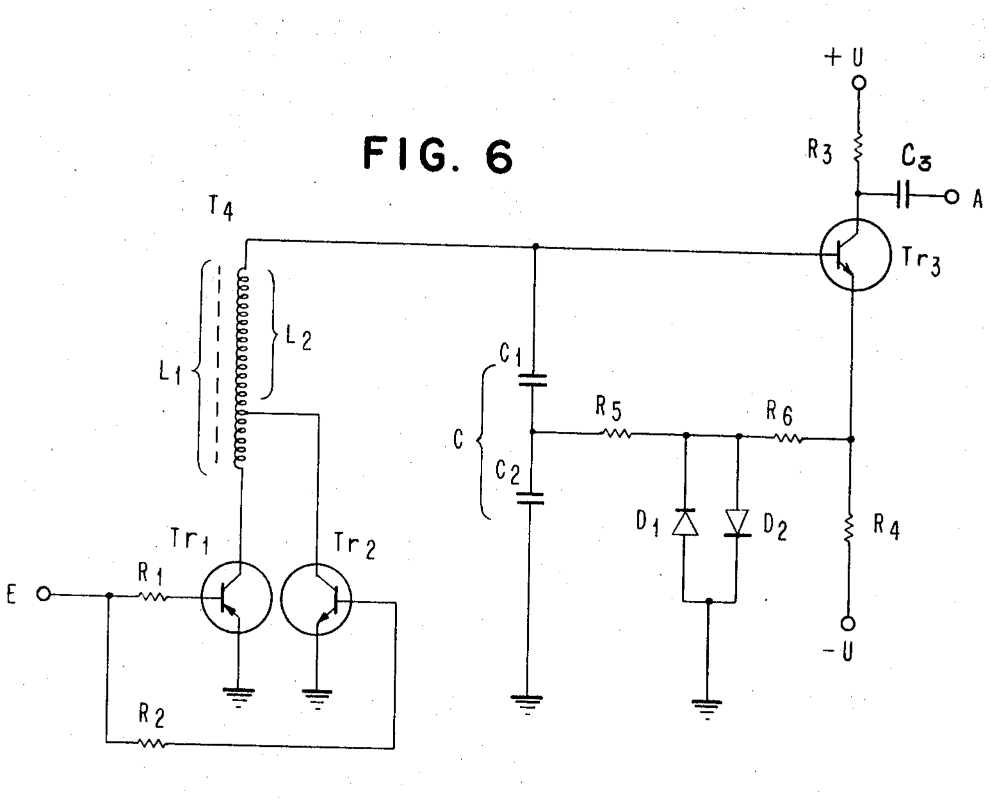
FIG. 6 shows an operative modulator incorporating the particular embodiment illustrated in FIG. 5.

FIG. 6 illustrates an operative modulator incorporating the embodiment shown in FIG. 5. Feed-back circuit RS comprises NPN-transistor TR3, operably connected in a well-known manner with resistances R4, R5, R6 and diodes D1, D2. Resonant circuit capacitor C is divided into capacitances C1, C2 such that the feed-back voltage may be delivered as closely as possible to the base point of the resonant circuit. Diodes D1 and D2 are used in a known manner to stabilize the feed-back and the voltage amplitude of the resonant circuit. The resonant circuit comprises serially connected capacitors C1 and C2 in parallel with either primary winding L1 or secondary winding L2 of autotransformer T4.

The electronic switch for frequency shifting comprises PNP-transistor TR1 and NPN-transistor TR2. The square wave characterizing the data to be transmitted (shown in curve I of FIG. 1) is applied to input E of the modulator and provided to the bases of transistors TR1 and TR2 via resistances R1 and R2. The positive and negative amplitudes of the square wave inputs are chosen such that transistor TR1 is conductive when the polarity is negative and transistor TR2 is conductive when the polarity is positive. A negative square wave input at E connects inductor L1 in parallel to resonant circuit capacitor C, and a positive polarity input connects inductor L2 in parallel to resonant circuit capacitor C. The oscillator consisting of the resonant circuit and the feed-back circuit is thus caused to oscillate at frequencies $f1$ and $f2$ which appear at the collector of transistor TR3 and to output terminal A through capacitor C3. Resistor R3 is provided in the known manner connecting the collector of TR3 to voltage source U.

*Operation*

The conditions necessary to establish a distortion-free operation of a modulator for frequency shifting time $t_0$ are set forth by the following equation:

$$\frac{i1}{u1}\sqrt{\frac{L1}{C1}}=\frac{i2}{u2}\sqrt{\frac{L2}{C2}} \qquad (1)$$

where L1, L2 and C1, C2 are the resonant circuit inductors and capacitors, respectively; $u1$ and $u2$ are the momentary voltage amplitudes of the sine waves of frequencies $f1$ and $f2$, respectively; and $i1$ and $i2$ are the momentary currents in the resonant circuits.

Equation 1 establishes the phase conditions for distortion-free transitions of the modulator.

In addition to the above requirement, the resonant circuit energy should remain constant before, during, and after the shifting process. The embodiments of the invention represent modulators using resonant circuits wherein at any shifting time the above conditions are simultaneously met without expensive complex circuitry to eliminate data distortions.

With reference to FIG. 2 the actual frequency shifting is effected by the operation of switch S1 which in turn is governed by the square wave representing the data (curve 1, FIG. 1). The oscillator operates at frequency $f1$ when switch S1 is in switch position 1 and oscillates at frequency $f2$ when switch S1 is in position 2. The energy stored in a free-oscillating circuit is:

$$\frac{C}{2}[u(t_0^+)]^2+\frac{L}{2}[i(t_0^+)]^2\frac{C}{2}[u(t_0^-]^2+\frac{L}{2}[i(t_0^-)]^2 \qquad (2)$$

where the left-hand side of the equation is evaluated at $t=t_0^-$ and the right-hand side of the equation is evaluated at $t=t_0^+$. The feed-back to the resonant circuit can be adjusted to insure that the voltage amplitude prior to shifting frequency is equal to that subsequent to the frequency shift. As the circuit capacitance C is the same prior to and subsequent to switching, the above equation for distortion-free frequency shifting may be reduced to:

$$i1\sqrt{L1}=i2\sqrt{L2} \qquad (3)$$

where, L1 is the resonant circuit current prior to switching and $i2$ is the resonant circuit current after switching.

If the above equation is satisfied, the resonant circuit energy prior to switching is equal to that subsequent to switching and the resonant circuit energy is maintained constant for both frequencies. Frequency $f1$ corresponds to:

$$\omega 1^2=\frac{1}{L1C} \qquad (4)$$

When shifting is effected, the circuit then oscillates at frequency $f2$ corresponding to:

$$\omega 2^2=\frac{1}{L2C} \qquad (5)$$

If the frequency ratio is designated F, then:

$$F=\frac{\omega 1}{\omega 2}=\sqrt{\frac{L2}{L1}} \qquad (6)$$

To satisfy the other requirement for distortion-free frequency shifting, the voltage gain V1 of amplifier A1 is selected to be equal to frequency ratio F. In addition, amplifier A1 has a high input impedance and a low output impedance such that the resonant circuit is not loaded and the amplifier delivers a load-invariant fixed voltage to the inductor. Consequently, with the resonant circuit oscillating at frequency $f1$, an alternating current is passed through inductor L2 which is in phase with the resonant circuit current through L1 and has an amplitude of:

$$I20=\frac{UVI}{\omega 1L2} \qquad (7)$$

The amplitude of the resonant circuit current through inductor L1 is:

$$I1=\frac{U}{\omega 1L1} \qquad (8)$$

When the resonant circuit oscillates at frequency $f1$, oscillation of the resonant circuit at frequency $f2$ results in a current through inductor L2 of:

$$I2=\frac{U}{\omega 2L2} \qquad (9)$$

The above relationships result in I20 equal to I2 if V1, the voltage gain of amplifier A1, equals the frequency ratio F. Consequently the above-stated conditions for distortion-free shifting from frequency $f1$ to frequency $f2$ are satisfied if amplifier A1 has a gain of F and amplifier A2 has a gain of $1/F$. The transition from one frequency to the other will always be in phase since the amplifiers A1, A2 always pre-energize the inactive inductor in proper phase and amplitude.

Those skilled in the art will recognize that an electronic switch could be substituted for switch S1 in any practical application.

Referring to FIG. 3, the inductance L1 of the primary winding of transformer T1 determines the oscillation frequency when switch S2 is in position 1. The secondary winding L2 of transformer T2 is simultaneously pre-energized through the primary winding L1 of transformer T2. Subsequent to the shifting process, inductance L2 of secondary winding of transformer T2 determines the oscillation frequency and simultaneously the primary winding L1 of transformer T1 is pre-energized through its secondary winding L2. Transformers T1 and T2 are identical and constructed to have maximum coupling between the primary and secondary windings. The transformation ratio is determined by the number of turns and is defined as:

$$n=\frac{W1}{W2}=\sqrt{\frac{L1}{L2}} \qquad (10)$$

From the above equation it is apparent that the transformation ratio corresponds to the reciprocal value of the frequency ratio F. The principle of operation of the embodiment shown in FIG. 3, therefore, corresponds exactly to that of the embodiment of FIG. 2 if it is recognized that the voltage gain V1 and V2 of amplifiers A1 and A2 in FIG. 2 has been shifted to transformers T1 and T2 of FIG. 3. Consequently, in the embodiment of FIG. 3 only one single amplifier having a voltage gain of 1 is required.

FIG. 4 shows a simplified embodiment of the modulator as shown in FIG. 3. To produce the frequency $f1$, conductor L1 is connected to the capacitor C when switch S3 is in position 1. Simultaneously, the secondary winding L2 of transformer T3 is pre-energized. The transfer of switch S3 to position 2 connects inductor L2 to capacitor C and simultaneously pre-energizes primary winding L1. The fact that the conditions for a distortion-free operation are met by the embodiment of FIG. 4 can be demonstrated by a comparison with the embodiment of FIG. 3. It will be recalled that transformers T1 and T2 in FIG. 3 are identical. Consequently, the transformer for pre-energizing the respective inductor not connected to the capacitor C may be eliminated. In switch position 1 the same current flows through the inductor L1 of transformer T1 as through the inductor L1 of transformer T2. The current flowing through inductor L1 of transformer T2 is, however, utilized for pre-energizing the secondary winding of transformer T2. Consequently, as can be seen from FIG. 4, the primary winding of transformer T3 may be directly employed for the generation of the oscillations and for pre-energizing the secondary winding. A similar comparison can be made for the situation when switch S3 is in position 2. Consequently, a simplified modulator as shown in FIG. 4 can be derived from the embodiment shown in FIG. 3 by eliminating amplifier A3 and one of the transformers.

The embodiment illustrated in FIG. 5 is identical to that shown in FIG. 4 with the exception that an autotransformer T4 is used as the transformer. An autotransformer is particularly advantageous as it is simple to produce and meets the afore-said requirements for distortion-free frequency shifting.

FIG. 6 shows an operative modulator using the embodiment shown in FIG. 5. Feedback circuit RS comprises NPN-transistor TR3, resistances R4, R5, R6 and diodes D1 and D2. The amplitude of the feed-back voltage is limited and stabilized in a well-known manner by diodes D1 and D2. The frequency shifting is effected by an electronic switch comprising PNP-transistor TR1 and NPN-transistor TR2. The data to be transmitted, characterized by the square wave (curve I, FIG. 1) is applied to input E of the modulator. The square wave amplitude is chosen such that transistor TR1 is rendered conductive and saturated and transistor TR2 is cut off when the input is negative. The conduction of transistor TR1 inserts inductor L1 in parallel to resonant circuit capacitor C such that the oscillator oscillates at frequency $f1$. Frequency $f1$ is available at output A from the collector of transistor TR3 through capacitor C3. Inductor L2 is simultaneously pre-energized according to the invention in proper phase and amplitude by the resonant circuit current. At shifting time $t_0$, transistor TR1 is cut off and transistor TR2 is rendered conductive and driven into saturation. Inductor L2 is in parallel with resonant circuit capacity C causing the oscillator to oscillate at frequency *f*2. While the oscillator operates at frequency *f*2, inductor L1 is again pre-energized in proper phase and amplitude by the resonant circuit current flowing through inductor L2 such that when shifting from frequency *f*2 to *f*1 at some subsequent time no distortions are produced.

The above-described embodiments of the modulator all have the common feature that the resonant circuit consists of a capacitor and of inductors which are connectable thereto. It will be apparent to those skilled in the art that by an analogous procedure, a modulator may be constructed in a corresponding manner comprising a single inductor and of capacitors connectable thereto.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In an asynchronous frequency shift keying transmission system, a modulator, comprising:
   - a single resonant element for all transmitted frequencies;
   - first and second resonanting means complementary to said single resonant element to produce a desired frequency shift in a carrier frequency;
   - first pre-energizing means interconnecting said first and second resonating means to pre-energize said second resonating means in phase and amplitude when said first resonating means is connected to said single resonant element;
   - second pre-energizing means interconnecting said second and first resonating means to pre-energize said first resonating means in phase and amplitude when said second resonating means is connected to said single resonant element;
   - switching means responsive to a data input signal to connect said single resonant element with one or the other of said complementary resonant means such that the means not connected is pre-energized in phase and amplitude with the connected means to maintain the resonant circuit energy constant;
   - whereby said first and said second pre-energizing means prevent phase distortion and transients when said single resonant element is switched between said first and said second resonating means.

2. The frequency shift keying modulator as in claim 1, wherein said first and said second pre-energizing means comprise amplifiers whose voltage gain is equal to the ratio of the two oscillator frequencies and equal to the inverse ratio of the two oscillator frequencies, respectively.

References Cited

UNITED STATES PATENTS

| | | | |
|---|---|---|---|
| 2,930,991 | 3/1960 | Edwards | 331—179 |
| 3,222,619 | 12/1965 | Hekimian | 331—117 |
| 3,249,896 | 5/1966 | Baker | 332—14 |
| 3,026,487 | 3/1962 | Walsh et al. | 331—109 |
| 3,137,826 | 6/1964 | Boudrias | 331—109 |

JOHN KOMINSKI, *Primary Examiner.*

U.S. Cl. X.R.

325—30, 163; 331—109, 117, 179, 181, 183; 332—16, 29